United States Patent [19]

Spangle et al.

[11] Patent Number: 4,741,834

[45] Date of Patent: May 3, 1988

[54] METHOD FOR UNDERGROUND SUPPORT AND REMOVAL OF HAZARDOUS IONS IN GROUND WATERS

[75] Inventors: Lloyd B. Spangle, Claremore; S. Ebow Coleman, Broken Arrow, both of Okla.

[73] Assignee: The Dow Chemical Company, Midland, Mich.

[21] Appl. No.: 861,027

[22] Filed: May 8, 1986

[51] Int. Cl.$^4$ .............................................. C02F 1/28
[52] U.S. Cl. ........................... 210/683; 106/DIG. 1; 210/686; 210/688; 210/747; 210/901
[58] Field of Search ............. 210/660, 747, 751, 901, 210/170, 686, 688, 683; 106/DIG. 1

[56] References Cited

U.S. PATENT DOCUMENTS

| | | |
|---|---|---|
| 4,230,568 | 10/1980 | Chappell .............................. 210/751 |
| 4,473,477 | 9/1984 | Beall ..................................... 210/747 |
| 4,530,765 | 7/1985 | Sabherwal ............................ 210/747 |
| 4,618,376 | 10/1986 | Saternus et al. .................... 210/751 |
| 4,659,385 | 4/1987 | Costopoulos et al. ........ 106/DIG. 1 |

*Primary Examiner*—Ivars Cintins
*Attorney, Agent, or Firm*—Veo Peoples, Jr.

[57] ABSTRACT

Rectifying the compressive strength and toxic waste levels of ground water passages is achieved through the formation of a type C fly ash screen reinforcement of the passage.

6 Claims, No Drawings

METHOD FOR UNDERGROUND SUPPORT AND REMOVAL OF HAZARDOUS IONS IN GROUND WATERS

BACKGROUND OF THE INVENTION

This invention relates in general to water treatment but specifically to methods and compositions for rectifying the land which water passes over, around or through in a manner that simultaneously reinforces the compressive strength of the land while retentively filtering certain toxic waste from the water.

Mining, excavation, drilling operations, processing of hazardous or offensive waste materials, disposal of combustion by-products, and other industrial or municipal activities have reached critical proportion in modern day society. As a consequence thereof, the quality of the environment in many geographical areas has become of such great concern that highly restrictive laws and regulations have been promulgated to protect our land, water and other natural resources.

In an attempt to comply with these laws, many products and processes have been developed to curtail further environmental destruction. Very few of these techniques, however, serve to rectify pre-existing environmental problems, particularly those problems associated with certain ground water passages such as abandoned mine shafts, pits and waterway bottoms of streams, lakes, ponds and spillways.

The prior art waste treatment processes tend to be complex and expensive ancillary stages to the actual production of goods and services that fuel our economy and often times burden the consumer with ever increasing cost in the way of increased prices and/or taxes. For example, batch waste treatment plants have been developed to retard infusion of hazardous waste into the local water system, but offer little rectification to pre-existing contamination. Additionally, such plants require collection and disposal of the extracted waste, which in turn creates additional cost to consumers. Disposal of the waste often transfers the problem to yet another geographical site where the expensive cycle may in-part be repeated.

More specifically, the U.S. Environmental Protection Agency in implementing the hazardous waste control program under the Resource Conservation and Recovery Act of 1976, promulgated in 1980 a series of regulations. The regulations require that sludges, slurries and other liquid wastes containing specified hazardous materials be pretreated, stabilized and dewatered prior to disposal in landfills. Additionally, the toxicity of the wastes must be measured and maintained at certain acceptable levels. One primary goal of these requirements is to achieve a non-flowing consistency to the waste. Accordingly, either the liquid content is reduced or the solid content is increased to eliminate the presence of free-standing liquid prior to final disposal in a landfill, and a number of proprietary means for dewatering, chemical fixation, solidification or combinations thereof have been developed.

Among the prior art methods for "chemical fixation" are those which detoxify, immobilize, insolubilize, or otherwise render the waste material suitably fixed and less hazardous for ultimate disposal in landfills as for example by ocean dumping, etc. U.S. Pat. No. 3,837,872 discloses a method for treating liquid wastes by adding an aqueous solution of alkali metal silicate and silicate setting agent, which converts the waste into a chemically and physically stable solid product. Other prior art chemical fixations which will be familiar to those skilled in the art are achieved through "encapsulation", "crystalline capture", and "pseudo mineralization".

The term "solidification" is employed in the waste treatment art to describe transformations of flowable waste residues into solid physical forms which are more stable for storage, earthen or ocean disposal, transportation, or re-use in construction such as highway pavement. For example, U.S. Pat. No. 3,980,558 discloses a method for treating liquid wastes by adding a solidification agent consisting essentially of hydraulic cement. Although such solidification does not directly convert or change the hazardous potential of the waste, it does create a barrier between the waste particles and the environment, limiting permeability of the waste and reducing the amount of surface area exposed to any diffusing waste. Oftentimes, drying, filtration or other forms of dewatering are categorized as solidification. U.S. Pat. No. 4,518,508 describes a solidification which involves cement, an absorbent material, and a powdered alkali metal silicate.

Conventional chemical fixations and solidifications have many shortcomings not the least of which is their inability in certain applications to provide suitable end products. Generally, prior art fixation and solidification techniques are only suitable for sludges and slurries containing substantial solids contents. For example, dewatering techniques frequently cannot achieve acceptable solid forms on slurries because of the difficulty in preventing reversion back to the original state. Moreover, the absorbed liquid phase of many fixed or solidified wastes can often be repatriated under the mechanical pressure which occurs in landfills or during handling and transportation. Attempts at compensating for these shortcomings through the infusion of special additives, binders or adsorbents has been expensive, impractical, and led to cumbersome duplicity in waste processing from one site to the next.

"Stabilization" is essentially a pretreatment process which alters waste to prevent further chemical reactions, e.g. the use of lime in biological sludges to kill or inactivate micro-organisms so that the sludge will not undergo further biological decomposition. Although stabilization is often considered a form of chemical fixation, there are subtle differences in the two. Nevertheless, many of the previously described problems are attendant to prior art forms of stabilization waste treatments.

Also, early methods of waste treatment which employed simple absorption techniques such as the addition of vermiculite, or solidification by large quantities of Portland cement to insure no free standing water after curing, gave rise to large volumetric increases in the material being disposed of. Although the system afforded the rapid setting rates essential to continuous processes, the disposal itself was prohibitively expensive as a consequence of excessive landfill utilization.

SUMMARY OF THE INVENTION

The present invention, briefly described, is a method and composition for permanently rectifying a ground water passage with hydraulic or type C fly ash wherein certain hazardous heavy metal and anion waste from local municipal or industrial operations can be continuously extracted from the water, solidified, and irreversibly restrained from redeposition while simultaneously rectifying weaknesses or degradations in the compressive strength of the contiguous earth. This waste treatment system reduces the need for certain batchwise waste treatments and subsequent waste removal while advantageously utilizing a material that might otherwise itself be discarded as waste.

Accordingly, it is an object of the present invention to provide an improved method for ground water waste treatment.

It is a further object of this invention to provide an improved composition for ground water waste solidification.

It is an even further object of the present invention to rectify contaminated ground water passages and to rectify the compressive strength of the earth contiguous thereto.

It is a still further object of the present invention to provide a more cost effective cycle of waste treatment and disposal while substantially reducing landfill utilization.

These objects and other features and advantages of the present invention will become apparent upon review of the following detailed description of the preferred embodiments and appended claims.

DETAILED DESCRIPTION OF THE PREFERRED EMBODIMENTS

In the process and composition of this invention, hydraulic or type C fly ash is employed.

Fly ash may be generally described as a noncombustible particulate solid generated in great quantities as a by-product, from the combustion of coal fuel, and carried out of the bed of solid fuel by the draft. Its principal constituents are silicon (as $SiO_2$), aluminum (as $Al_2O_3$), and iron as ($F_2O_3$), often together with lesser amounts of other metals such as magnesium (as $MgO$) and titanium (as $TiO_2$), sulfur (as $SO_2$), calcium (as $CaO$), sodium (as $Na_2O$) and Potassium (as $K_2O$).

Most commonly, two varieties of fly ash may be found. There is the Type F fly ash generated from high rank, anthracite or bituminous coals (often called soft coals) and the Type C fly ash generated from low rank, subbituminous or lignite coals (often called brown coal and having the distinct texture of the original wood). However, for purposes of the present invention, Type F fly ash may be distinguished from the Type C on the basis of their respective content of calcium and/or lime ($CaO$). Type F will contain less than 8% by weight $CaO$, while the Type C fly ash of the present invention will contain more than 8% $CaO$, and preferably greater than 15%. Also critical to the Type C fly ash of the present invention is the concentration of tricalcium aluminate ($3CaO.Al_2O_3$). Sufficient binding requires at least about 5% by weight, preferably 7-9%.

Prior to this invention, Type C fly ash was prohibited in many land reclamation operations such as oil well cementing, while the use of Type F fly ash was permitted for such purposes. Among the reasons for this were that (a) Type C was believed to cause premature setting which presented placement problems, and that (b) the variation in chemical compositions of Type C were believed to give rise to inconsistent slurry and setting properties. However, it has now been found that the functionality of Type F fly ash is inadequate for many of the above described purposes because it cannot sufficiently set, gel or harden to desired compressive strengths at a rate rapid enough to accommodate industrial and municipal needs and requires excessive amounts of the relatively expensive agent, Portland cement. Accordingly, for many land reclamation purposes and waste disposal purposes, Type F fly ash has proven to be highly undesirable if not altogether devoid of utility. Nevertheless, it has been surprisingly discovered, in attempts to obtain more cost effective reclamation, that the use of Type C fly ash having certain critically controlled calcium and aluminum compositions, substantially enhances the filtration and adsorption of waste and pollutants from contiguous water without reversal from dispersion or washout. This is particularly advantageous when reclaimed lands simultaneously function as ground water passages.

In the composition of the present invention, it is preferred to pre-mix the ash into an aqueous slurry containing from about 40 to 300% water by weight of ash. The slurry can be pumped into ground water passages such as abandoned mine shafts, excavation pits, in production drilling wells, waterway bottoms, spillways, etc., where the ground water is known to contain undesirable levels of heavy metals and anions such as mercury, lead, zinc, strontium, cadmium, iron, zinc, chloride, sulfate and nitrate.

The slurry is permitted to spontaneously gel or set to the desired compressive strengths as a function of time and temperature. At land reclamation temperatures of from about 40° F. to about 150° F. but preferably 120° F., a compressive strength of as high as 1000 psi can be achieved within 24 hours, using a slurry with 60% water by weight of ash. Lower temperatures and higher water contents can slow the development of compressive strength.

The heavy metal and anion content is substantially eliminated from the contiguous water. Type C fly ash slurries may be applied to ground water passages in the manner that concrete is grouted in place or any other practical placement method. Once it is in place, it forms a receptable screen to filter out and retain pollutants in fixed solid and stable form. The content in water of heavy metals such as copper, magnesium, cadmium, iron and zinc are reduced to below 0.3 ppm respectively but preferably below 0.1 ppm. The content of each anion such as chloride, sulfate and nitrate is reduced to below 10 ppm but preferably below 5 ppm. Larger amounts of sodium, calcium, potassium, lead, barium and strontium may be present but significant reduction is nonetheless achieved. In one embodiment of this invention, the use of a pumpable slurry as a grouting for subsurface deep well applications is particularly preferred.

If desired, one may use additional absorbents preferably carbon or sulfur to enhance the effective removal of contaminants.

Foaming may be induced in mixing the fly ash slurry, however, wide ranges of tolerance are acceptable, preferably densities of 10 to 14 lbs. per gallon for in unfoamed systems and as low as 7 lbs. per gallon of slurry in foamed systems.

Also, it may be appreciated that Type C ash can be mixed with cement in proportions of preferably from about 2:1 to 1:1 and remain within the contemplation of this invention.

The following examples are set forth to illustrate the method of this invention, and are not intended to be limitative thereof.

EXAMPLE 1

Type C fly ash collected from the draft of an existing power plant were slurried with acid mine mix water. The principle components of the fly ash were as reflected below in Table 1.

TABLE 1

| Component | Amount (wt. %) | Component | Amount (wt. %) |
|---|---|---|---|
| $3CaO \cdot Al_2O_3$ | 7.2 | $Fe_2O_3$ | 6.3 |
| CaO | 27.3* | $SO_3$ | 3.8 |
| $SiO_2$ | 29.2 | $Na_2O$ | 1.5 |
| $Al_2O_3$ | 18.8 | $K_2O$ | 0.7 |
| MgO | 7.0** | | |

*3.2% of which exist freely
**32.2% of which exist freely

The slurry at 300 parts of the above described fly ash and 450 parts of the acid mine mix water was observed to readily facilite mixing and homogeous dispersion while also being pumpable through commercially available grouting equipment. It formed a hardened product of high permeability to ground water after curing at 80° to 100° F. to a compressive strength of 20 psi within 24 hours. The curing temperature of 80° F. permitted the product to sufficiently set after just 3 hours. This is in sharp contrast to Type F fly ash slurries which will not set at water contents above about 40%.

EXAMPLE 2

An identical Type C fly ash is slurried with 40% water by weight of the ash. The mixture is pumpable and sets to a compressive strength as high as 400 psi after only 4 hours when cured at 80° F. The product is highly permeable to gound water. Acceptable products were also produced for the Type C fly ash slurries depicted below in Table 2.

TABLE 2

| % Mix Water (by weight of ash) | Compressve Strength, psi (80% F) | | | |
|---|---|---|---|---|
| | 1 day | 3 days | 7 days | 28 days |
| 150 | 20 | 30 | 40 | 80 |
| 200 | 10 | 10 | 20 | 40 |
| 250 | — | — | — | 20 |

EXAMPLE 3

The Type C fly ash of Example 1 when mixed at a 50:50 weight ratio with standard portland cement cured at maximum landfill temperatures of 120° F. and exemplified the following compressive strengths as compared to a 50:50 Type F fly ash/standard portland cement mixture of the same water content and cured under the same conditions.

TABLE 3

| Type of Fly Ash | Compressive Strength, psi | |
|---|---|---|
| | 1 day | 7 days |
| C | 2730 | 6700 |
| F | 1960 | 5690 |

EXAMPLE 4

The Type C fly ash slurry of Example 1 was mixed to a density of 10.3 lbs./gal. After initial hardening, contaminated acid mine water was allowed to flow through the product and thereafter analyzed for heavy metal and anion contamination. The reduction in contaminants is reflected below in Table 4.

TABLE 4

| Contaminant | Initial Amount (ppm) | Final Amount (ppm) |
|---|---|---|
| Cu | 0.05 | None detected* |
| Mg | 88.00 | 0.27 |
| Cd | 0.25 | None detected* |
| Fe | 120.00 | 0.09 |
| Zn | 67.00 | None detected* |
| Cl | 27.00 | 5.0< |
| $SO_4$ | 2100.00 | 5.0< |
| $NO_3$ | 2.50 | 0.3< |

*Amounts below 0.05 ppm were undetectable.

What is claimed is:

1. A method for rectifying ground water passages comprising,
    (a) forming a pumpable slurry of Type C fly ash containing at least about 8% by weight CaO and at least about 5% by weight tricalcium aluminate and water comprising from about 40 to about 300% water by weight of the ash;
    (b) grouting the pumpable slurry into the passage;
    (c) permitting the pumpable slurry to cure until it sets into a water permeable screen; and
    (d) contacting said screen with ground water contaminated with hazardous waste;
    whereby hazardous wastes are removed from the ground water and retentatively fixed, while simultaneously reinforcing the compressive strength of the ground water passage.

2. The method of claim 1 wherein the amount of tricalcium aluminate is between about 7% and about 9% by weight.

3. The method of claim 1 wherein the pumpable slurry is cured to at least 20 psi within 24 hours under from about 40° to about 150° F.

4. The method of claim 3 wherein the temperature is no more than 120 degrees F.

5. The method of claim 1 wherein the Type C fly ash is slurried with cement.

6. The method of claim 5 wherein the weight ratio of Type C fly ash to cement is 1:1.

* * * * *